Oct. 24, 1944.  D. A. SWENSON  2,361,247
COMBINATION INCINERATOR AND BROILER DEVICE
Filed Nov. 8, 1940  3 Sheets-Sheet 1

INVENTOR.
Ditmar A. Swenson
BY M. Y. Charles
ATTORNEY.

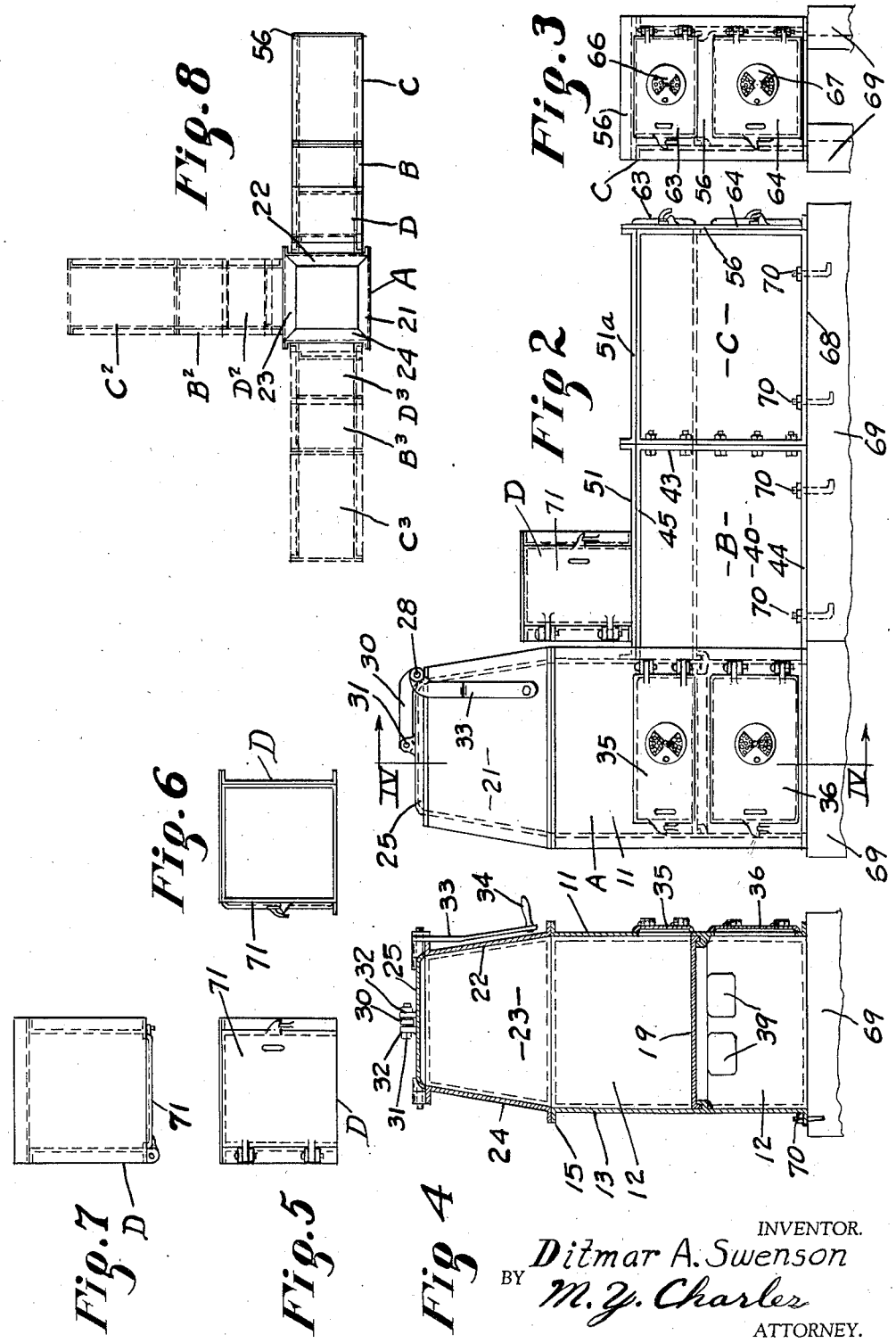

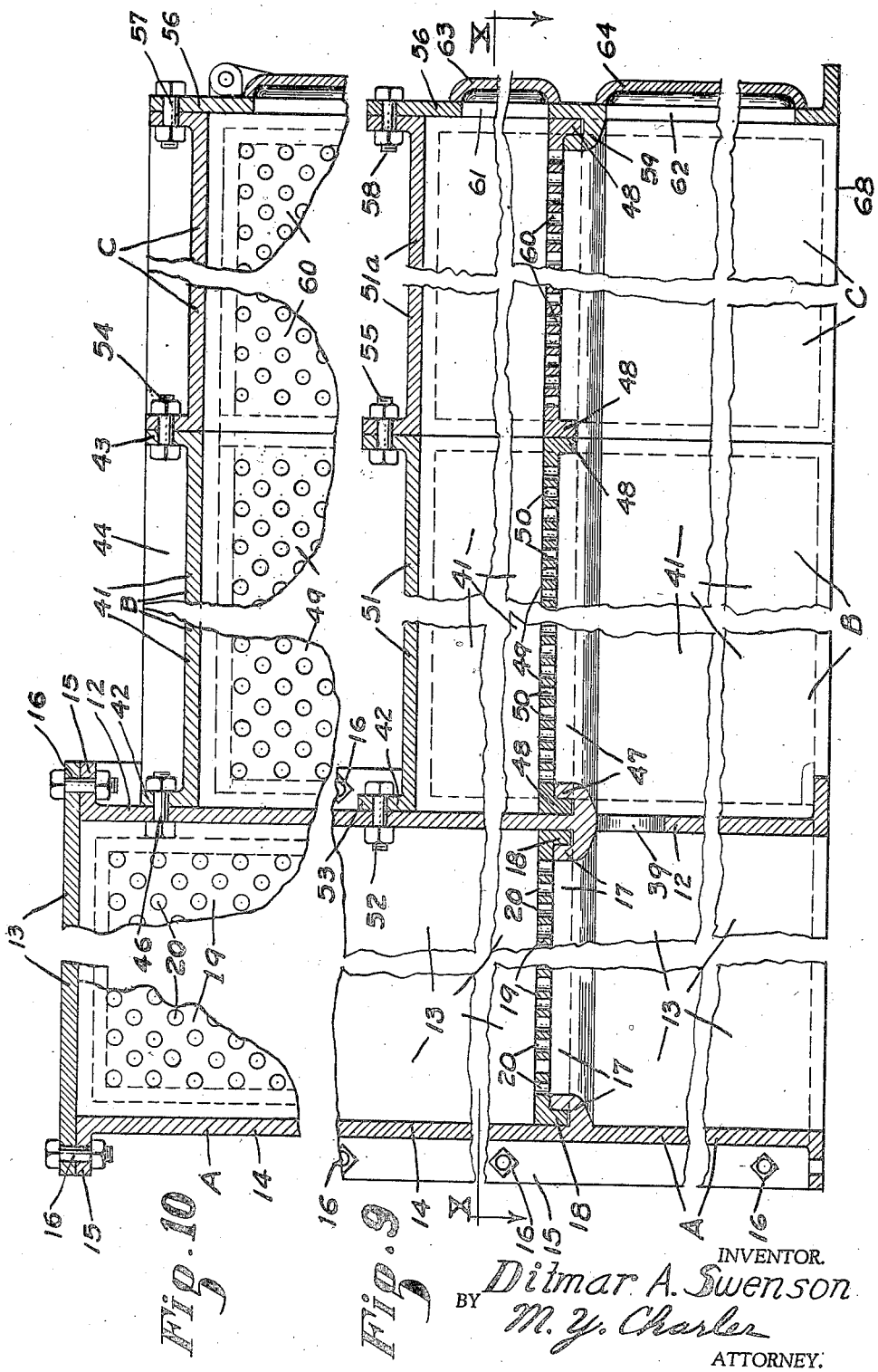

Patented Oct. 24, 1944

2,361,247

UNITED STATES PATENT OFFICE 2,361,247

COMBINATION INCINERATOR AND BROILER DEVICE

Ditmar A. Swenson, Wichita, Kans.

Application November 8, 1940, Serial No. 364,936

1 Claim. (Cl. 126—1)

My invention relates to an improvement in combination incinerators and broiler devices. The object of my invention is to provide a combination incinerator and broiler that is made of sections or plate like elements, preferably cast iron, that can be easily and quickly assembled or disassembled.

A further object is to provide a device of the kind mentioned that can be increased or decreased in size by the addition or subtraction of unit portions so that if the device is to be used for private use, a small unit may be employed, but if the device is to be used in public places, such as parks and the like, the device can be readily increased in capacity by adding additional broiler units to the incinerator unit in such a manner as to radiate at several different angles from the incinerator so that several parties may be grouped around one incinerator and each party have a broiler for their use.

A still further object is to provide a device of the kind mentioned in which the broiler units may be increased in capacity by the addition of one or more broiler sections to those already there.

Another object is to provide a device of the kind mentioned to which fryer plates and an oven may be placed above the broiler grates.

A still further object is to provide a device of the kind mentioned that is strong and durable, cheap to manufacture and sell, simple, easy and quick to set up, and one that can be easily and quickly set up, and one that can be easily and quickly torn down and moved and then reassembled. These and other objects will be more fully described as this description progresses.

Now referring to the accompanying drawings,

Fig. 2 is a front view of the combination incinerator, broiler, frying plates and oven.

Fig. 3 is an end view of the broiler and fryer unit as seen from the right of Fig. 2.

Fig. 4 is a sectional view through the incinerator, the view being taken along the line IV—IV in Fig. 2, and looking in the direction of the arrows.

Fig. 5 is a front view of the oven unit employed in the device.

Fig. 6 is a side view of the oven unit shown in Fig. 5.

Fig. 7 is a plan view of the oven unit shown in Fig. 5.

Fig. 8 is a plan view of the device and illustrating how the radially positioned units are placed around the incinerator.

Fig. 9 is an enlarged detail vertical sectional view through the incinerator, broiler and frying plates.

Fig. 10 is an enlarged detail horizontal sectional view through the device, the view being taken along the line X—X of Fig. 9 and looking in the direction of the arrows.

Figure 1:
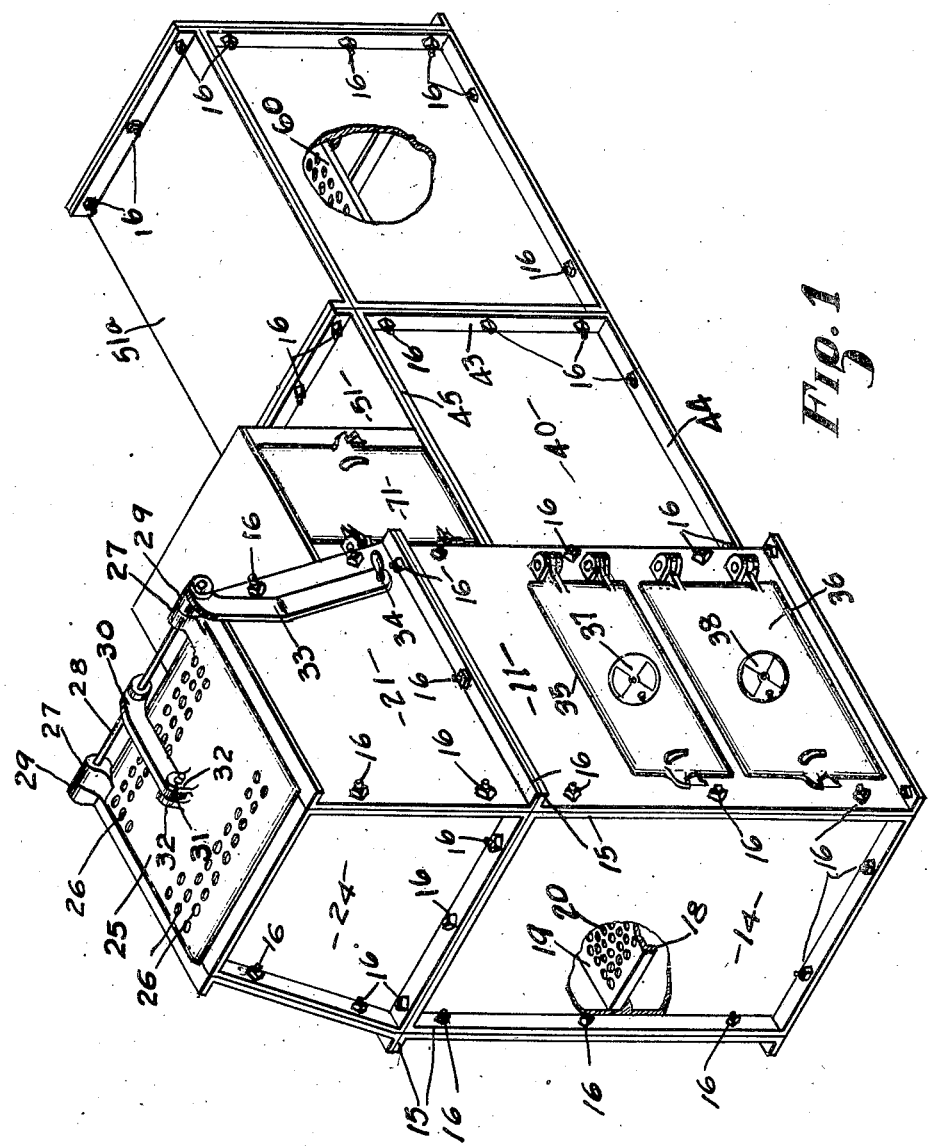
Fig. 1 is a perspective view of my improved combination incinerator and broiler device including the frying plates and oven.

In the drawings (Figures 1 and 2), the device is shown as consisting of an incinerator unit A, a combination broiler and fryer unit B connected with the incinerator unit A, an extension broiler and fryer unit C connected to the unit B, and an oven unit D. As shown in Fig. 8, a second and third broiler and fryer units are connected with the incinerator unit A, the second broiler and fryer units consisting of the sections $B^2$, $C^2$ and $D^2$, and the third broiler and fryer units consisting of the sections $B^3$, $C^3$ and $D^3$, each section corresponding to its respective letter B, C and D shown in Figures 1, 2 and 3.

The incinerator unit consists of a rectangular housing A that is built up of a plurality of substantially flat cast iron sections 11, 12, 13 and 14 which are flanged as indicated at 15 and the adjacent plates are bolted together with bolts as shown at 16.

On the inner face of the plates 11, 12, 13 and 14 and approximately at the central portion thereof is a channel formation 17 in which is removably seated the flange 18 of a broiler plate or incinerator grate 19 which comprises the plate 19 that is perforated as indicated at 20.

The incinerator A is provided with a tapering flue portion connecting of the plate portion 21, 22, 23 and 24 that are flanged and bolted together and to the lower section of the unit the same as above section of the unit A.

At 25 is shown a spark arrester, or a cover for the flue. The cover 25 is perforated as at 26, or, if desired may be made as a frame and provided with a screen, so as to permit a draft to flow through the flue and prevent the passage of sparks and the like from the flue. The door 25 is provided with ears 27 in which is rigidly mounted a shaft 28, the outer ends of which are revolvably carried in bearing elements 29 that are rigidly carried by the flue plate 22. Rigidly mounted on the shaft 28 is one end of a lever arm 30, the other end of the lever arm 30 being pivotally mounted at 31 between a pair of ear like elements 32 integrally found on the cover element 25. On one of the ends of the shaft 28 is rigidly mounted one end of an operating lever 33, the other end of the lever 33 is provided with a handle 34 with which the handle 33 may be swung to open the door 25.

The plate 11 of the incinerator unit A is provided with a pair of doors 35 and 36, the door 35 opening into the incinerator above the grate 19 and the door 36 opening into the incinerator below the grate 19. The doors 35 and 36 are provided with adjustable draft openings 37 and 38. The plates 13 and 14 are solid plates while the plate 12 is provided with one or more holes 39 of each size as may be desired by the manufacturer, and are positioned below the grate 19 for purposes that will later be explained.

At B is a broiler and fryer unit which is composed of a front and rear plate 40 and 41 having flange portions 42, 43, 44 and 45. The plates 40 and 41 being rigidly attached to the plate 12 of the unit A by means of bolts 46 that pass through the flanges 42 and the plate 12. The inner face of the plates 40 and 41, and the outer face of the plate 12 are provided with a channel formation 47 in which is seated flange portions 48 of a broiler grate 49 which is formed of a plate 49 having perforations 50 therein.

At 51 is a fryer plate that rests on the upper edges of the front and rear plates 40 and 41 and may or may not be joined to the incinerator plate 12 by means of bolts 52 which pass through the plate 12 and a flange 53 on the fryer plate 51.

The unit C is a duplicate of section B, the plates of the sections B and C being bolted together with bolts 54, and the frying plates of the two units B and C are bolted together with bolts 55 as shown in Figures 9 and 10.

In the open end of the unit B or C, as the case may be, is a closure plate 56 that is bolted to the side walls of the units by means of bolts 57 and, if desired, the closure plate 56 may also be bolted to the frying plate by means of the bolts 58. The inner face of the plate 56 is provided with a channel formation 59 in which is seated the flange portion 48 of the broiler plate 60 which is a duplicate of the plate 49. The closure plate 56 is provided with two openings 61 and 62 which are provided with closure doors 63 and 64 which are hingedly hung on the closure frame 56, and the doors 63 and 64 are each provided with adjustable draft openings 66 and 67. The opening 63 in the plate 56 opens into the space between the broiler plates 49 and 60 and the fryer plates 51 and 51a, and the opening 62 opens into the space between the broiler plates 49 and 60 and the ground line 68.

At 69 is shown a concrete bore or foundation on which the assembly of the combination incinerator, broiler and fryer is set and attached thereto by means of bolts 70 that are set in the concrete and which pass through the flanges on the section of the several units as will be readily understood.

If it is desired to increase the capacity of the device, an additional section may be added to the incinerator by adding the units $B^2$ and $C^2$ and by substituting a plate such as plate 12 for the plate 13 in the incinerator unit A; and if a third section is to be added, it may be done by the addition of the unit $B^3$ and $C^3$ and by substituting a plate the same as plate 12 for the plate 14 in the incinerator unit A. It will be understood that the sections $B^2$ and $C^2$, and $B^3$ and $C^3$ are identical with the sections B and C shown in Figures 1, 2, 9 and 10.

If only the unit A is to be used, a plate such as 13 or 14 will be substituted for the plate 12.

The unit D is an oven that is made of plates and bolted together, the front plate having an opening therein and a closure door 71. The oven is portable and may be positioned as desired on the fryer plates 51 or 51a, or, if desired, the fryer plates may be removed from the units B or C so as to expose the broiler plates 49 and 60. If the frying plates 51 and 51a are removed, the oven unit D may set on the upper edges of the front and rear plates 40 and 41.

The operation of the device is as follows: If only the unit A is to be employed, the units B, C and D of course would be omitted, and if the unit A is to be used as a broiler, the fire would be built on the ground beneath the broiler plate 19, and the meat to be broiled would be passed through the opening for the door 35 and placed on the broiler plate 19 for broiling purposes, or if the unit is to be used strictly as an incinerator, the lever 33 may be swung so as to raise the door 25, and material to be burned may be thrown through the flue element onto the grate 19, where it may be burned.

Now if the incinerator is to be used as a combination incinerator, broiler and fryer, the unit B may be added to the incinerator and if still more capacity is desired, the unit C may be added and the oven unit D may also be added and to still further increase the capacity the units $B^2$ and $C^2$ and $B^3$ and $C^3$ including their respective oven units may be added.

Now if it is desired to use the unit as a broiler the fire may be built on the ground in the units B and C and beneath the broiler plates 49 and 60 by opening the door 64 and passing the fuel through the opening.

The fryer plate 51a may be removed and also the fryer plate 51 if desired, whereupon the broiler plates 49 and 60 are exposed for broiling purposes, or if desired, one or more of the plates may be left over the broiler plates and may be used for frying purposes.

The oven unit D may be left on one of the fryer plates 49 or 60 or if one or both of the fryer plates is removed the oven may be supported on the upper edges of the front and rear plates 40 or 41.

By adjusting the draft openings 66 and 67 in the doors 63 and 64, the draft will flow through these draft openings and through the openings 39 and upwardly through the incinerator and be discharged through the opening thereof.

The operation of all of the B, C and D units are identical.

Such modifications may be employed as lie within the scope of the appended claim without departing from the spirit and intention of the invention. Now having fully described my invention, I claim:

In a combination incinerator, broiler and fryer device; said device having in combination a flue unit and one or more combination broiler and fryer units, said combination broiler and fryer units being detachably attached to adjacent side plates of, said flue unit, said adjacent side plates of the flue unit having openings therein so that the flue unit will draw a horizontal draft through each combination broiler and fryer unit connected thereto, said flue unit having a grate therein and spaced above the bottom thereof, and two doors in said flue unit, one above and one below said grate so as to permit the flue unit to be used both as a broiler and an incinerator, a third door, said third door being horizontally positioned in the top of said flue and being vented so as to serve as a spark arrestor, each of said combination broiler and fryer units having side plates that are spaced apart, and a broiler grate positioned between the side plates below the top edges of the side plates and above the opening in the side plate of the flue unit, and being supported by said side plates of the broiler and fryer unit, and a fryer plate, said fryer plate being supported on the top of said side plates of the broiler and fryer unit and being removable therefrom, one end of each of said side plates being attached to the lower portion of said flue unit, the other end of said side walls of the broiler and fryer unit having a closure thereon, and said closure having doors thereon, and said doors having adjustable units therein to govern the amount of draft permitted to be drawn through the combination broiler and fryer unit by the flue unit.

DITMAR A. SWENSON.